US009171251B2

(12) United States Patent
Camp et al.

(10) Patent No.: US 9,171,251 B2
(45) Date of Patent: Oct. 27, 2015

(54) CONTEXT-AWARE ANALYSIS AND ADAPTATION

(75) Inventors: Joseph Camp, Dallas, TX (US); Onur Altintas, Tokyo (JP); Rama Krishna Vuyyuru, Somerset, NJ (US); Dinesh Rajan, Dallas, TX (US)

(73) Assignees: TOYOTA JIDOSHA KABUSHIKI KAISHA, Toyota-shi, Aichi-ken (JP); Southern Methodist University, Dallas, TX (US)

( * ) Notice: Subject to any disclaimer, the term of this patent is extended or adjusted under 35 U.S.C. 154(b) by 546 days.

(21) Appl. No.: 13/617,367

(22) Filed: Sep. 14, 2012

(65) Prior Publication Data

US 2013/0073506 A1 Mar. 21, 2013

Related U.S. Application Data

(60) Provisional application No. 61/535,846, filed on Sep. 16, 2011.

(51) Int. Cl.
| | |
|---|---|
| *G06F 17/00* | (2006.01) |
| *G06N 5/02* | (2006.01) |
| *G05B 13/00* | (2006.01) |
| *H04L 29/06* | (2006.01) |
| *H04W 4/00* | (2009.01) |
| *H04W 4/02* | (2009.01) |

(52) U.S. Cl.
CPC *G06N 5/02* (2013.01); *G05B 13/00* (2013.01); *H04L 69/00* (2013.01); *H04W 4/006* (2013.01); *H04W 4/028* (2013.01)

(58) Field of Classification Search
None
See application file for complete search history.

(56) References Cited

PUBLICATIONS

Bök, P.-B.; Tuchelmann, Y., "Context-Aware QoS Control for Wireless Mesh Networks of UAVs," Computer Communications and Networks (ICCCN), 2011 Proceedings of 20th International Conference on , vol., no., pp. 1,6, Jul. 31-Aug. 4, 2011.*
R. Matos, C. Marques, S. Sargento, Context-based connectivity and characterization of wireless mesh networks: simulation study, in: IEEE Workshop on Mobile Computing and Emerging Communication Networks, Co-located with IEEE Globecom, 2010.*
Shankar, P.; Nadeem, T.; Rosca, J.; Iftode, L., "CARS: Context-Aware Rate Selection for vehicular networks," Network Protocols, 2008. ICNP 2008. IEEE International Conference on , vol., no., pp. 1,12, Oct. 19-22, 2008.*

(Continued)

*Primary Examiner* — Jeffrey A Gaffin
*Assistant Examiner* — David H Kim
(74) *Attorney, Agent, or Firm* — Patent Law Works LLP

(57) ABSTRACT

A system and method for providing multi-dimensional context-aware adaptation in vehicular networks is disclosed. The system comprises a collection module, a context resolving module, a parameter determination module and a distribution module. The collection module collects context data describing a context in a communication environment. The context resolving module resolves the context data to a matching historical context and determines one or more historical context groups associated with the matching historical context. The parameter determination module determines a subset of operating parameters from the one or more historical context groups. The distribution module distributes the subset of operating parameters to a network stack communication module.

18 Claims, 9 Drawing Sheets

(56) References Cited

PUBLICATIONS

R. Matos, S. Sargento, K. Hummel, A. Hess, K. Tutschku, H. de Meer. Context-based wireless mesh networks: a case for network virtualization. Telecommunication Systems (2011), pp. 1-14.*

Camp, Joseph, and Edward Knightly. "Modulation Rate Adaptation in Urban and Vehicular Environments: Cross-layer Implementation and Experimental Evaluation." (2008). MobiCom'08, Sep. 14-19, 2008, San Francisco, California, USA.*

* cited by examiner

CONTEXT-AWARE ANALYSIS AND ADAPTATION

CROSS REFERENCE TO RELATED APPLICATIONS

This application claims priority under 35 USC §119(e) to U.S. Application No. 61/535,846, entitled "System for Context-Aware Analysis and Adaptation" filed Sep. 16, 2011, the entirety of which is herein incorporated by reference.

BACKGROUND

The specification relates to a network system. In particular, the specification relates to a system and method for providing multi-dimensional context-aware adaptation in vehicular networks.

Unlike communication environments for fixed or slow moving mobile devices, communication environments for vehicular networks are frequently changing due to high mobility of a vehicle, changes in wireless propagation channels and varying node densities. It is desirable for any communication protocol implementation to understand such changes in order to achieve better network performance. However, existing systems are not developed to adapt to such varying conditions. First, existing systems fail to consider the use of context information existing in a communication environment. For example, existing systems do not consider any context information when configuring one or more layers in a protocol stack. Second, existing systems narrowly focus on a single layer of a protocol stack and fail to adapt to the varying conditions at multiple layers of the protocol stack in a unified manner. Third, existing systems require modifications or changes in the existing protocol stack when implementing parameter adaptation in the existing protocol stack.

SUMMARY OF THE INVENTION

The specification overcomes the deficiencies and limitations of the prior art at least in part by providing a system and method for providing multi-dimensional context-aware adaptation in vehicular networks. The system comprises a collection module, a context resolving module, a parameter determination module and a distribution module. The collection module collects context data describing a context in a communication environment. The context resolving module resolves the context data to a matching historical context and determines one or more historical context groups associated with the matching historical context. The parameter determination module determines a subset of operating parameters from the one or more historical context groups. The distribution module distributes the subset of operating parameters to a network stack communication module.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
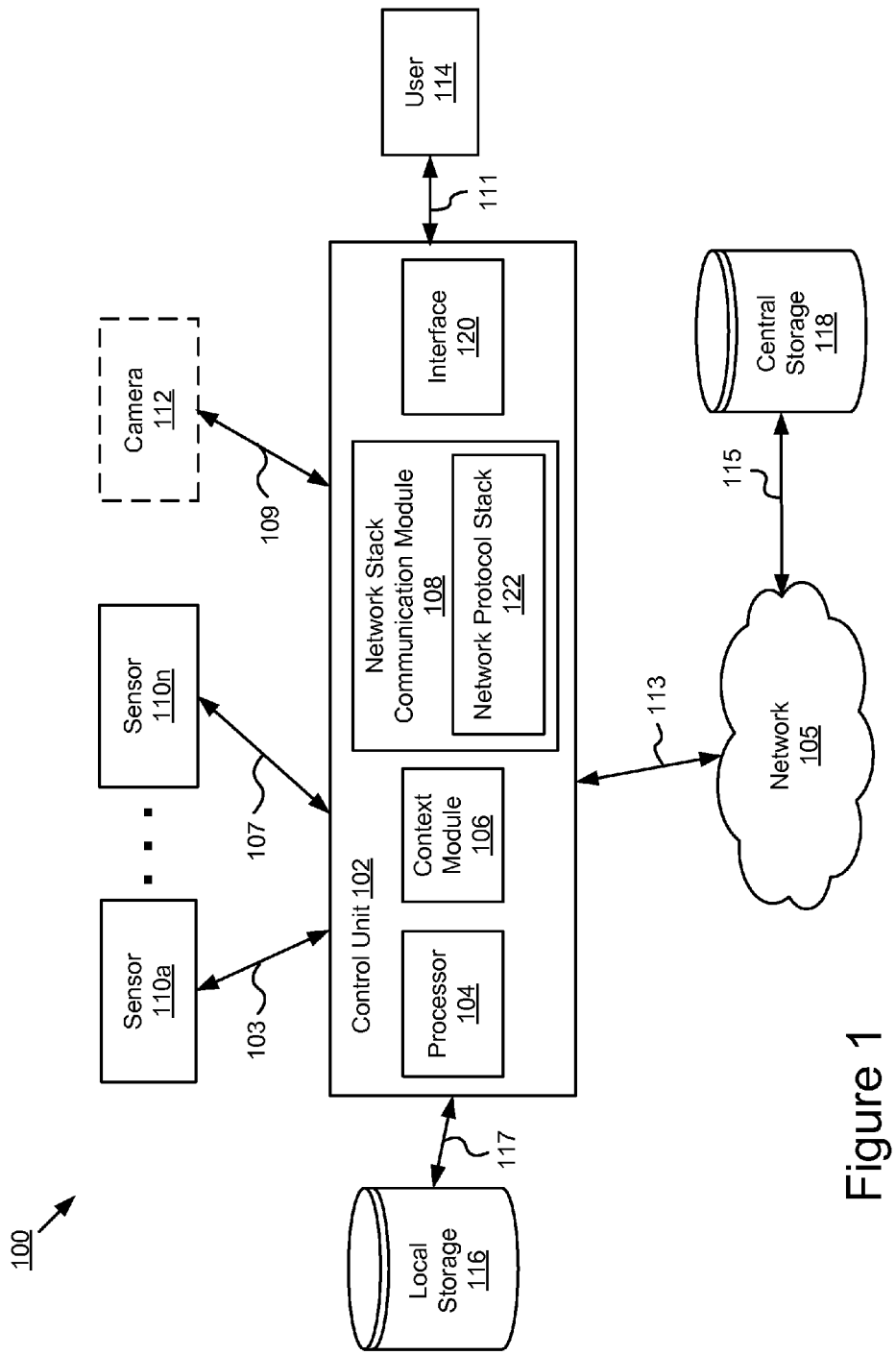
FIG. 1 is a high-level block diagram illustrating a system for providing multi-dimensional context-aware adaptation in vehicular networks according to one embodiment.

A system and method for providing multi-dimensional context-aware adaptation in vehicular networks is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, compact disc read-only memories (CD-ROMs), magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for providing multi-dimensional context-aware adaptation in vehicular networks according to one embodiment. The illustrated system 100 includes a control unit 102 that interacts with a user 114, one or more sensors 110a and 110n (referred to individually or collectively as sensor 110) and a local storage device 116. Optionally, the system 100 also includes a camera 112. Although only two sensors 110a and 110n are illustrated, one skilled in the art will recognize that any number of sensors 110 are available. Furthermore, while only one control unit 102, one camera 112 and one local storage device 116 are depicted in FIG. 1, the system 100 could include one or more control units 102, one or more cameras 112 and one or more local storage devices 116. One skilled in the art will also appreciate that the system 100 may include other entities not shown in FIG. 1 such as a speaker, a display device, an input device, etc.

In the illustrated embodiment, the sensor 110a is communicatively coupled to the control unit 102 via signal line 103. The sensor 110n is communicatively coupled to the control unit 102 via signal line 107. The camera 112 is communicatively coupled to the control unit 102 via signal line 109. The user 114 interacts with the control unit 102 via signal line 111. The local storage device 116 is communicatively coupled to the control unit 102 via signal line 117.

In the illustrated embodiment, the system 100 further comprises a network 105 and a central storage device 118. The control unit 102 is communicatively coupled to the network 105 via signal line 113. The central storage device 118 is communicatively coupled to the network 105 via signal line 115.

The control unit 102 is any processor-based computing device. For example, the control unit 102 is an electronic control unit ("ECU") implemented in a vehicle. In one embodiment, the control unit 102 is implemented using a single integrated circuit such as a system-on-chip (SOC). In other embodiments, the control unit 102 is any computing device such as a laptop computer, a desktop computer, a tablet computer, a mobile telephone, a personal digital assistant (PDA) or any other computing device with one or more processors embedded therein, etc. The control unit 102 includes, among other things, a processor 104, a context module 106, a network stack communication module 108 and an interface 120. These components of the control unit 102 are communicatively coupled to each other. In one embodiment, the control unit 102 includes any other components conventional to a control unit such as a memory (not pictured), etc.

The processor 104 comprises an arithmetic logic unit, a microprocessor, a general purpose controller or some other processor array to perform computations, retrieve data stored on the local storage device 116 and/or the central storage device 118, etc. Processor 104 processes data signals and may comprise various computing architectures including a complex instruction set computer (CISC) architecture, a reduced instruction set computer (RISC) architecture, or an architecture implementing a combination of instruction sets. Although only a single processor 104 is shown in FIG. 1, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The context module 106 is code and routines that, when executed by the processor 104, analyzes context data to provide operating parameters for multiple layers in a protocol stack. In one embodiment, the context module 106 includes code and routines stored in an on-chip storage of the processor 104. In another embodiment, the context module 106 is implemented using hardware such as a field-programmable gate array (FPGA) or an application-specific integrated circuit (ASIC). In yet another embodiment, the context module 106 is implemented using a combination of hardware and software. The context module 106 is described below in more detail with reference to FIGS. 2 and 4-6.

The network stack communication module 108 is code and routines that, when executed by the processor 104, implements a network protocol stack 122 for data communication in a network. A network protocol stack 122 includes one or more layers such as a physical layer, a media access control (MAC) layer, an internet protocol layer, a transport layer and an application layer. One skilled in the art will recognize that a network protocol stack 122 may include any other layers such as a session layer, a presentation layer, etc. A network protocol stack 122 is also referred to as a protocol stack herein.

Figure 7A:
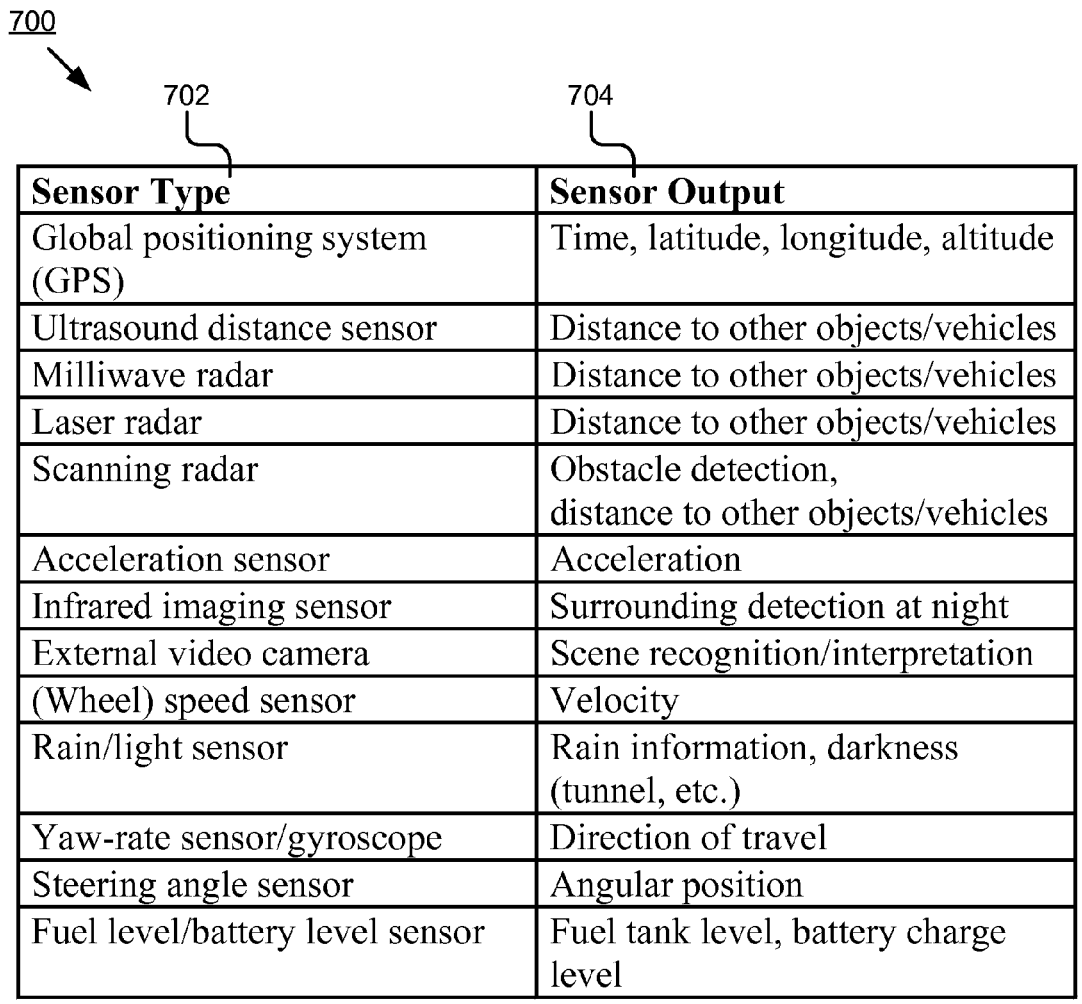
FIG. 7A is a graphical representation of a table illustrating sensor data collection according to one embodiment.
Figures 7B, 7C:
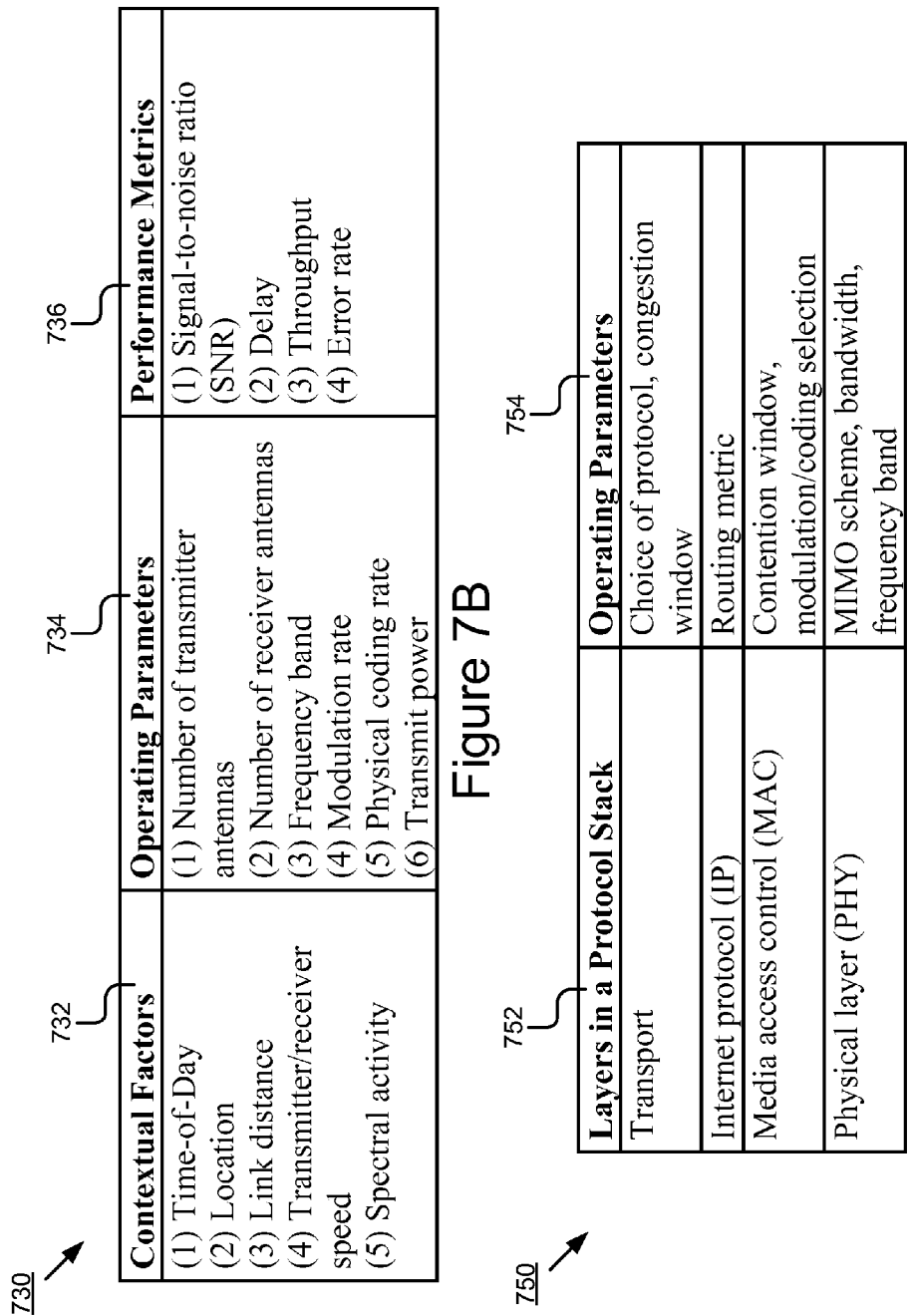
FIG. 7B is a graphical representation of a table illustrating content included in a context group according to one embodiment.
FIG. 7C is a graphical representation of a table illustrating operating parameters for various layers in a protocol stack according to one embodiment.

In one embodiment, the network stack communication module 108 receives one or more sets of operating parameters from the context module 106. For example, the network stack communication module 108 receives a subset of operating parameters from the context module 106. An operating parameter is a parameter for configuring a protocol stack. For example, an operating parameter includes one of a number of transmitter antennas, a number of receiver antennas, a frequency band, a modulation rate, a physical coding rate and a transmit power, etc. Further examples of operating parameters are illustrated in FIGS. 7B and 7C. A set of operating parameters includes one or more operating parameters for configuring one or more layers in a protocol stack. For example, a set of operating parameters includes a first operating parameter (e.g., a frequency band) for configuring a physical layer and a second operating parameter (e.g., a modulation rate) for configuring a MAC layer.

The network stack communication module 108 configures a protocol stack for data communication based at least in part on the one or more sets of operating parameters. For example, the network stack communication module 108 receives a first operating parameter such as a frequency band for a physical layer and a second operating parameter such as a coding rate for a MAC layer from the context module 106, and configures the physical layer in the protocol stack using the first operating parameter and the MAC layer using the second operating parameter.

The interface 120 is a device configured to handle communications between the control unit 102 and other components of the system 100. For example, the interface 120 includes one or more of an in-vehicle touch screen for receiving inputs from the user 114 and a microphone for capturing voice inputs from the user 114. The interface 120 sends the inputs from the user 114 to the control unit 102. In one embodiment, the interface 120 is configured to communicate an output from the control unit 102 to the user 114. For example, the interface 120 includes a display device for displaying one or more operating parameters to the user 114.

In one embodiment, the interface 120 includes a network interface for connecting the control unit 102 to the network 105. In another embodiment, the interface 120 includes a port for direct physical connection to the network 105 or to another communication channel. For example, the interface 120 includes a universal serial bus (USB), category 5 cable (CAT-5) or similar port for wired communication with the network 105. In another embodiment, the interface 120 includes a wireless transceiver for exchanging data with the network 105, or with another communication channel, using one or more wireless communication methods, such as IEEE 802.11, IEEE 802.16, BLUETOOTH®, near field communication (NFC) or another suitable wireless communication method. In one embodiment, the interface 120 includes a NFC chip that generates a radio frequency (RF) for short-range communication. One having ordinary skill in the art will recognize that the interface 120 may include other types of devices for providing the functionality described herein.

The sensor 110 is any type of conventional sensor configured to collect any type of data. For example, the sensor 110 is one of the following: a light detection and ranging (LIDAR) sensor; an infrared detector; a motion detector; a thermostat; and a sound detector, etc. Further examples of sensors 110 are illustrated in FIG. 7A. Persons having ordinary skill in the art will recognize that other types of sensors are possible.

In one embodiment, the system 100 includes a combination of different types of sensors 110. For example, the system 100 includes different sensors 110 measuring one or more of a time, a location of a vehicle (e.g., a latitude, longitude and altitude of the location), a distance from the vehicle to other objects (e.g., roadside structure, traffic lights, etc.), a distance from the vehicle to nearby vehicles, an acceleration of the vehicle, a velocity of the vehicle, a direction of travel, a fuel tank level and/or a battery charge level, etc. One skilled in the art will recognize that the sensors 110 may measure any other physical parameters in a surrounding environment of a vehicle such as temperature, humidity, etc. The sensors 110 generate sensor data describing the measurement and send the sensor data to the context module 106. Further examples of sensor measurement outputs are illustrated in FIG. 7A.

The optional camera 112 is an optical device for recording images. For example, the camera 112 records images of roads, traffic lights, other vehicles and/or objects (e.g., roadside structure), pedestrians crossing the road and environments surrounding a vehicle, etc. In one embodiment, the camera 112 is mounted in the front of a vehicle. In other embodiments, the camera 112 is mounted on other parts of the vehicle. The camera 112 sends image data describing the images to the context module 106.

The user 114 is a human user. In one embodiment, the user 114 is one of a driver driving a vehicle and/or a passenger sitting on a passenger seat. The user 114 interacts with, or otherwise provides an input to, an interface 120, which sends and receives different types of data to and from the control unit 102. For example, the interface 120 includes a touch screen and the user 114 touches a portion of the touch screen with a finger or a stylus to provide an input.

The local storage device 116 is a non-transitory memory that stores data. For example, the local storage device 116 is a dynamic random access memory (DRAM) device, a static random access memory (SRAM) device, flash memory or some other memory device known in the art. In one embodiment, the local storage device 116 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device known in the art. The local storage device 116 is described below in more detail with reference to FIG. 3.

The network 105 is a conventional type of network, wired or wireless, and may have any number of configurations such as a star configuration, token ring configuration or other configurations known to those skilled in the art. In one embodiment, the network 105 comprises one or more of a local area network (LAN), a wide area network (WAN) (e.g., the Internet) and/or any other interconnected data path across which multiple devices communicate. In another embodiment, the network 105 is a peer-to-peer network. The network 105 is coupled to or includes portions of a telecommunications network for sending data in a variety of different communication protocols. For example, the network is a 3G network or a 4G network. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email, etc. In yet another embodiment, all or some of the links in the network 105 are encrypted using conventional encryption technologies such as secure sockets layer (SSL), secure HTTP and/or virtual private networks (VPNs).

The central storage device 118 is a non-transitory memory that stores data. For example, the central storage device 118 is a dynamic random access memory (DRAM) device, a static random access memory (SRAM) device, flash memory or some other memory device known in the art. In one embodiment, the central storage device 118 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device known in the art. The central storage device 118 is described below in more detail with reference to FIG. 3.

As described below with reference to FIGS. 2 and 4-6, the system 100 for providing multi-dimensional context-aware adaptation in vehicular networks is particularly advantageous. First, the system 100 utilizes context data describing a context in a communication environment and provides, based on the context, multi-dimensional operating parameters for configuring multiple layers of a protocol stack for data transmission in a unified manner. Second, the system 100 provides the operating parameters to the network stack communication module 108 without requiring any modifications and/or changes in the implementation of any existing protocol stack.

Context Module

Figure 2:
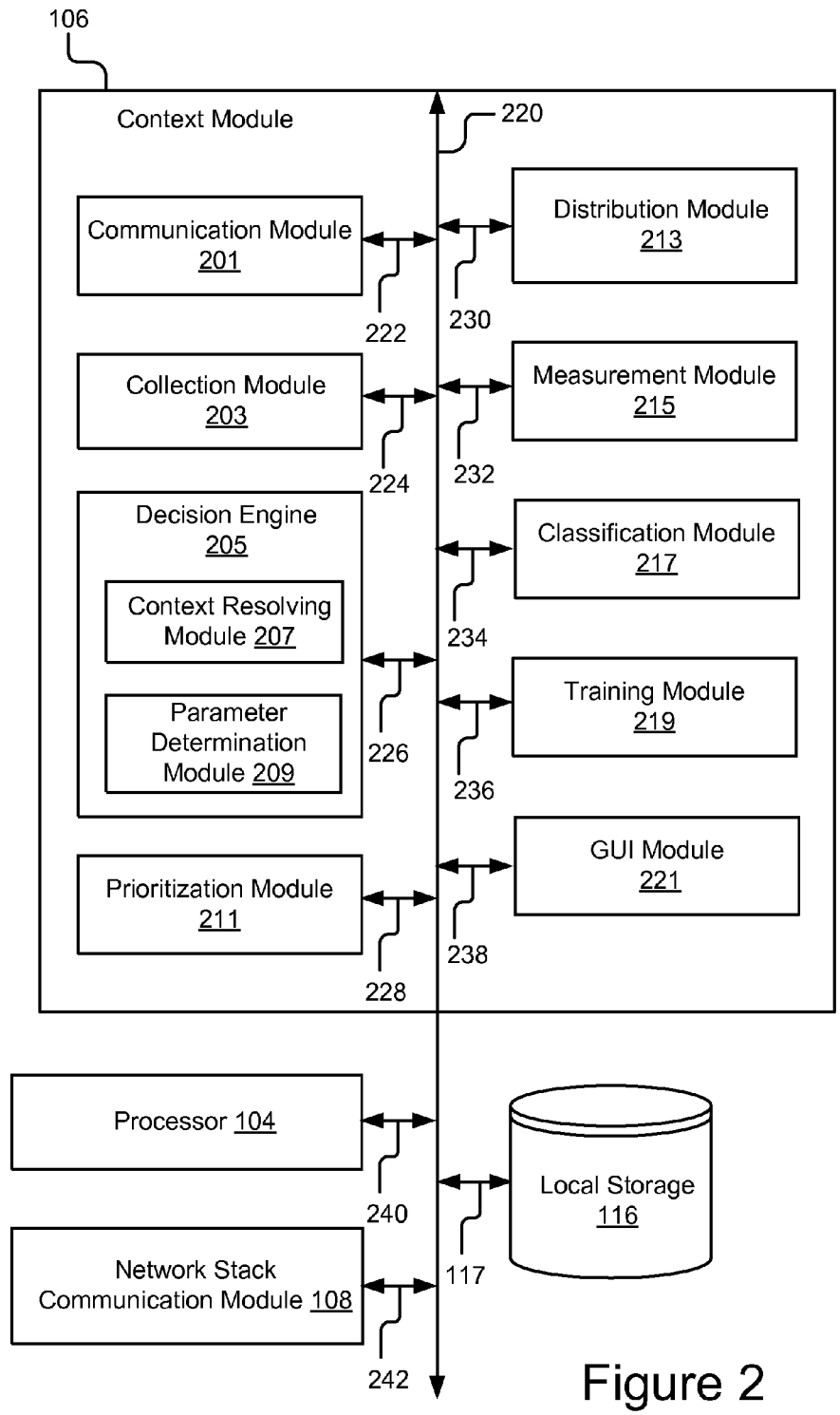
FIG. 2 is a block diagram illustrating a context module according to one embodiment.

Referring now to FIG. 2, the context module 106 is shown in more detail.

FIG. 2 is a block diagram illustrating a context module 106 according to one embodiment. The context module 106 includes a communication module 201, a collection module 203, a decision engine 205, a prioritization module 211, a distribution module 213, a measurement module 215, a classification module 217, a training module 219 and a graphical user interface (GUI) module 221. These components of the context module 106 are communicatively coupled to a bus 220 for communication with each other. In the illustrated embodiment, the processor 104 is communicatively coupled to the bus 220 via signal line 240. The local storage device 116 is communicatively coupled to the bus 220 via signal line 117. The network stack communication module 108 is communicatively coupled to the bus 220 via signal line 242.

The communication module 201 is code and routines that, when executed by the processor 104, handles communications between components of the context module 106 and other components of the system 100. For example, the communication module 201 receives sensor data from one or more sensors 110 and sends the sensor data to the collection module 203. In one embodiment, the communication module 201 receives image data from the camera 112 and sends the image data to the collection module 203. In another embodiment, the communication module 201 receives one or more operating parameters from the distribution module 213 and sends the operating parameters to the network stack communication module 108. The communication module 201 is communicatively coupled to the bus 220 via signal line 222.

In one embodiment, the communication module 201 receives graphical data from the GUI module 221 and sends the graphical data to the interface 120 for displaying a user interface to a user. In another embodiment, the communication module 201 receives data (e.g., context group data) from other components of the context module 106 (e.g., the classification module 217) and stores the data in one or more of the local storage device 116 and/or the central storage device 118. In yet another embodiment, the communication module 201 retrieves data from one or more of the local storage device 116 and/or the central storage device 118 and sends the data to other components of the context module 106 such as the decision engine 205. In other embodiments, the communication module 201 may provide any other functionality for handling communications described herein.

The collection module 203 is code and routines that, when executed by the processor 104, collects context data in a communication environment. The collection module 203 is communicatively coupled to the bus 220 via signal line 224. A communication environment for a vehicle is related to one or more factors such as a location of a vehicle, a surrounding scene (e.g., urban, suburban, rural area, etc.), an application priority (e.g., safety or non-safety application), a vehicle velocity and road traffic condition (e.g., heavy traffic, congestion, etc.), etc. Context data is data describing a context in a communication environment. A context is data describing any condition of a communication environment. For example, a context indicates that a vehicle that transmits data to another vehicle is moving at a speed of 25 miles per hour in an urban area.

The collection module 203 collects context data from one or more of sensors 110 and the camera 112. In one embodiment, the context data includes one or more of sensor data received from the sensors 110 and image data received from the camera 112. In other embodiments, the context data includes any other data related to a context such as data describing a weather condition in the communication environment received from a website and/or traffic data describing a traffic situation in the surrounding area received from a traffic infrastructure (e.g., a server providing traffic data), etc.

It is particularly beneficial to collect context data describing a context in a communication environment since, for example, a particular context leads to a particular wireless communication behavior and the utilization of the context improves data communication performance such as increasing data throughput and reducing transmission delay. For example, if a context indicates that a vehicle is moving in an urban environment with a safety application priority on, the context module 106 determines to implement a low-power transmission strategy to avoid interference with nearby vehicles. However, if the context indicates that the vehicle is moving in a rural area, more power may be used for data transmission without causing interference to other remote vehicles.

The decision engine 205 is code and routines that, when executed by the processor 104, analyzes the context data and determines operating parameters for one or more layers in a protocol stack based at least in part on the context data. The decision engine 205 includes a context resolving module 207 and a parameter determination module 209. The components of the decision engine 205 are communicatively coupled to each other. The decision engine 205 is communicatively coupled to the bus 220 via signal line 226.

The context resolving module 207 is code and routines that, when executed by the processor 104, resolves context data to a matching historical context. In one embodiment, the context resolving module 207 receives context data describing a context in a communication environment from the collection module 203. The context resolving module 207 determines one or more contextual factors from the context data. For example, the context resolving module 207 determines contextual factors such as a time-of-day and a location from context data (e.g., sensor data) generated by a global positioning system (GPS). As another example, the context resolving module 207 determines a contextual factor such as a transmitter speed from context data (e.g., sensor data) generated by a speed sensor.

A contextual factor is a parameter associated with a context in a communication environment. For example, a contextual factor is one of a time-of-day, a location, a surrounding scene (e.g., urban, suburban, rural, forest, etc.), a link distance, a transmitter speed, a receiver speed, a spectral activity, a network topology, Doppler effect, path loss, shadowing effect and/or multipath delay spread, etc., in a communication environment. One skilled in the art will recognize that other contextual factors are possible.

In one embodiment, the context resolving module 207 retrieves historical context data describing one or more historical contexts from a local storage 116 and/or a central storage 118. Historical context data is context data collected in the past. A historical context is a context collected in the past. In one embodiment, the historical context data describing historical contexts is stored in the local storage 116 and/or the central storage 118.

The context resolving module 207 compares the context data to the historical context data and determines a matching historical context for the context data from the one or more historical contexts. A matching historical context is a historical context matching to the context data. For example, a matching historical context is a historical context whose contextual factors match to contextual factors in the context data.

In one embodiment, the context resolving module 207 determines a first set of values for one or more contextual factors from the context data. The context resolving module 207 also determines another set of values for the same contextual factors for each of the historical contexts. The context resolving module 207 determines a matching historical context for the context data as a historical context having a second set of values closest to the first set of values for the context data (e.g., the second set of values having a minimal distance to the first set of values). For example, the context resolving module 207 determines a matching historical context as a historical context having a first location closest to a second location in the context data and having a first transmitter speed closest to a second transmitter speed in the context data.

A context group is a group of data related to a context. For example, a context group includes context data describing a context in a communication environment, a set of operating parameters and network performance data describing a network performance in the communication environment when a protocol stack is configured using the set of operating parameters. In one embodiment, a context group also includes one or more contextual factors from the context data. Examples of content included in a context group are illustrated in FIG. 7B.

A network performance is a data transmission performance in a communication environment when a protocol stack for data communication is configured using a set of operating parameters. In one embodiment, a network performance is measured by one or more performance metrics such as a signal-to-noise ratio (SNR), a delay, an error rate (e.g., a bit error rate, a packet error rate) and a throughput, etc.

In one embodiment, a first context group has the same context as a second context group. However, the first context group has a different network performance from the second context group, because the first context group has a different set of operating parameters from the second context group. In another embodiment, a first context group has the same network performance as a second context group. However, the first context group has a different set of operating parameters from the second context group, because a first context in the first context group is different from a second context in the second context group. In yet another embodiment, a first context group has the same set of operating parameters as a second context group. However, the first context group has a different network performance from the second context group, because a first context in the first context group is different from a second context in the second context group.

A historical context group is a context group collected in the past. In one embodiment, a historical context group is a context group stored in one or more of the local storage 116 and/or the central storage 118. In one embodiment, a historical context group includes historical context data describing a historical context, a set of operating parameters and network performance data describing a network performance for the set of operating parameters under the historical context.

In one embodiment, the context resolving module 207 determines one or more historical context groups associated with the matching historical context. For example, the context resolving module 207 determines one or more historical context groups whose context is the same as the matching historical context. As another example, the context resolving module 207 determines one or more historical context groups whose contextual factors are similar to the contextual factors in the matching historical context. The context resolving module 207 sends one or more group identifiers (IDs) identifying the one or more historical context groups to the parameter determination module 209.

The parameter determination module 209 is code and routines that, when executed by the processor 104, determines operating parameters for configuring a protocol stack. In one embodiment, the parameter determination module 209 identifies a performance requirement for transmitting data in a communication environment. A performance requirement is data describing a goal to achieve when transmitting data in a communication environment. For example, a performance requirement includes a signal-to-noise ratio (SNR) requirement (e.g., a SNR at a receiver is required to be above a predetermined threshold), an error rate requirement (e.g., an error rate for data transmission is required to be below an error threshold), a delay requirement (e.g., a delay for data transmission is not allowed to exceed a predetermined amount of time), a throughput requirement (e.g., a minimum throughput is required to be above a predetermined throughput threshold) and a quality of service (QoS) demand from an application (e.g., a tradeoff between delay for voice traffic and throughput for data traffic), etc. One skilled in the art will recognize that other performance requirements are possible.

In one embodiment, a performance requirement is predetermined by an administrator of the system 100. In another embodiment, a performance requirement is determined by an application (e.g., a safety-related application, a non-safety related application, a QoS demand for an application, etc.) running on the control unit 102 that requests to transmit data to other entities such as other vehicles and/or servers.

In one embodiment, the parameter determination module 209 receives one or more group IDs identifying one or more historical context groups from the context resolving module 207. The parameter determination module 209 retrieves context group data describing the one or more historical context groups from the local storage 116. If any of the historical context groups is not stored in the local storage 116, the parameter determination module 209 retrieves context group data describing the historical context group from the central storage 118. The parameter determination module 209 determines parameter data describing one or more sets of operating parameters from the context group data. The parameter determination module 209 also determines network performance data describing a network performance associated with each set of operating parameters from the context group data.

In one embodiment, the parameter determination module 209 determines, based at least in part on the performance requirement, a subset of operating parameters from the one or more sets of operating parameters in the context group data. The subset of operating parameters includes one or more sets of operating parameters whose associated network performance satisfies the performance requirement. For example, if a network performance associated with a first set of operating parameters meets the performance requirement (e.g., a throughput of the first set of operating parameters is above the throughput requirement), the parameter determination module 209 includes the first set of operating parameters in the subset of operating parameters. However, if a network performance of a second set of operating parameters does not satisfy the performance requirement, the parameter determination module 209 does not include the second set in the subset of operating parameters. Examples of a subset of operating parameters for multiple layers in a protocol stack are illustrated in FIG. 7C.

In another embodiment, the parameter determination module 209 instructs the prioritization module 211 to prioritize, based at least in part on the performance requirement, the one or more sets of operating parameters associated with the one or more historical context groups. The prioritization module 211 sends one or more prioritized sets of operating parameters to the parameter determination module 209. The prioritization module 211 is described below in more detail. The parameter determination module 209 determines, based at least in part on the performance requirement, a subset of operating parameters from the one or more prioritized sets of operating parameters. For example, the parameter determination module 209 selects one or more sets (e.g., five sets) of operating parameters having the highest rankings from the prioritized sets of operating parameters. For each set of the one or more sets (e.g., five sets) having the highest rankings, the parameter determination module 209 includes the set in the subset of operating parameters if the network performance of the set satisfies the performance requirement.

In yet another embodiment, the parameter determination module 209 eliminates, from the one or more sets of operating parameters associated with the one or more historical context groups, any operating parameters that are not applicable in a context described by the context data. For example, for a context in a downtown area, the parameter determination module 209 excludes high-order modulation schemes from the one or more sets of operating parameters because of multi-path effect in the downtown area. The parameter determination module 209 forms a subset of operating parameters from the one or more sets of operating parameters by excluding any operating parameters not applicable in the context. For example, the parameter determination module 209 excludes any operating parameters not applicable under the context for each layer of a protocol stack. In one embodiment, the parameter determination module 209 sends the subset of operating parameters to the distribution module 213.

The prioritization module 211 is code and routines that, when executed by the processor 104, prioritizes one or more sets of operating parameters. In the illustrated embodiment, the prioritization module 211 is communicatively coupled to the bus 220 via signal line 228.

In one embodiment, the prioritization module 211 receives parameter data describing one or more sets of operating parameters from the parameter determination module 209. The prioritization module 211 ranks the one or more sets of operating parameters based at least in part on a network performance for each set of operating parameters. For example, the prioritization module 211 generates a higher ranking for a first set of operating parameters than a second set of operating parameters, if a first network performance associated with the first set is better than a second network performance associated with the second set. The prioritization module 211 generates one or more prioritized sets of operating parameters. The one or more prioritized sets of operating parameters are one or more sets of operating parameters with a first set having a higher ranking listed before a second set having a lower ranking.

In another embodiment, the prioritization module 211 prioritizes one or more sets of operating parameters based at least in part on a predicted network performance. A predicted network performance is a network performance aiming to achieve in a communication environment. The prioritization module 211 determines a distance between a network performance for each set of operating parameters and the predicted network performance. The prioritization module 211 ranks the one or more sets of operating parameters based at least in part on a distance between each set of operating parameters and the predicted network performance. For example, the prioritization module 211 generates a higher ranking for a first set of operating parameters than a second set of operating parameters, if a first distance associated with the first set is smaller than a second distance associated with the second set. In one embodiment, a distance between a network performance and a predicted network performance is an absolute value of a difference between the network performance and the predicted network performance. For example, if the network performance is the same as the predicted network performance, the distance is zero.

In yet another embodiment, the prioritization module 211 prioritizes context group data stored in a storage (e.g., local storage 116, central storage 118) based at least in part on one or more contextual factors that have more impact on network performance than other contextual factors. For example, the prioritization module 211 prioritizes context group data based at least in part on a transmitter speed and/or a receiver speed, since mobility of a transmitter and/or a receiver is a key factor causing changes in the context for data transmission. The prioritization performed by the prioritization module 211 is advantageous since, for example, it processes data with the highest priority first and therefore reduces the consumption of resources required for determining operating parameters to configure a protocol stack.

The distribution module 213 is code and routines that, when executed by the processor 104, distributes one or more sets of operating parameters to the network stack communication module 108. For example, the distribution module 213 receives a subset of operating parameters that includes one or more sets of operating parameters from the parameter determination module 209. The distribution module 213 distributes the subset of operating parameters to the network stack communication module 108 so that the network stack communication module 108 selects operating parameters from the subset of operating parameters to configure a protocol stack. The subset of operating parameters presents a reduced searchable space for adaption and allows for legacy operation in the network stack communication module 108. In the illustrated embodiment, the distribution module 213 is communicatively coupled to the bus 220 via signal line 230.

The measurement module 215 is code and routines that, when executed by the processor 104, measures a network performance in a communication environment. In the illustrated embodiment, the measurement module 215 is communicatively coupled to the bus 220 via signal line 232. In one embodiment, the measurement module 215 measures a network performance corresponding to a set of operating parameters configured in a protocol stack. For example, the measurement module 215 measures one or more of a SNR, a delay, an error rate and/or a throughput, etc., in a data communication network when the network stack communication module 108 configures a protocol stack using a set of operating parameters received from the distribution module 213. In one embodiment, the measurement module 215 sends network performance data describing the network performance to the classification module 217.

The classification module 217 is code and routines that, when executed by the processor 104, classifies a network performance and context data associated with the network performance to form a context group. For example, the classification module 217 generates a mapping between a context described by the context data, a network performance associated with the context data and a set of operating parameters configured to achieve the network performance in the context. This mapping relationship is illustrated as a context group. The classification module 217 is communicatively coupled to the bus 220 via signal line 234.

In one embodiment, the classification module 217 receives context data describing a context from the collection module 203, a set of operating parameters configured in a protocol stack from the network stack communication module 108 and network performance data describing a network performance corresponding to the set of operating parameters and the context from the measurement module 215. In one embodiment, the classification module 217 receives a set of context data and a set of network performance data. The classification module 217 synchronizes the network performance data with the corresponding context data.

In one embodiment, the classification module 217 determines one or more contextual factors from the context data such as Doppler effect, path loss, shadowing effect, multipath delay spread, time-of-day, transmitter speed and/or receiver speed, etc. The classification module 217 relates the one or more contextual factors to the network performance such as SNR, delay, throughput and error rate (e.g., bit error rate, packet error rate, etc.). The classification module 217 generates a context group including the one or more contextual factors, the network performance and a set of operating parameters corresponding to the network performance and the context.

In one embodiment, the classification module 217 determines whether the generated context group is distinct from the historical context groups stored in the local storage 116 and/or the central storage 118. For example, the classification module 217 determines whether the generated context group includes any new features not included in the historical context groups such as a new context not included in the historical context groups, a new set of operating parameters leading to better performance in a context, etc. If the generated context group is not distinct from the historical context groups, the classification module 217 does not store the generated context group in any storage device. If the generated context is distinct, the classification module 217 determines whether to storage the generated context group in the local storage 116 and/or the central storage 118. For example, the classification module 127 determines whether to store the generated context group in the local storage 116 or the central storage 118 based on a tradeoff between a processing speed and available storage space in the local storage 116.

The tradeoff between storing context groups in the local storage 116 and the central storage 118 is illustrated herein by example. The local storage 116 is embedded in a vehicle, which means the system 100 may retrieve data stored in the local storage 116 in a faster speed than retrieving data from the central storage 118. However, the local storage 116 generally has limited storage space and the system 100 have to selectively choose what context groups to store in the local storage 116. On the other hand, the central storage 118 may have unlimited storage space, but retrieving data from the central storage 118 is time-consuming and occupies a portion of the available wireless bandwidth for data communication.

In one embodiment, the classification module 127 stores the generated context group in both the local storage 116 and the central storage 118. In another embodiment, the classification module 127 determines to store the generated context group in the local storage 116. The generated context group is uploaded to the central storage 118 from the local storage 116 in a later time when the control unit 102 has high-speed internet access. In yet another embodiment, the classification module 127 stores the generated context group in the central storage 118 only. The generated context group is delivered to the local storage 116 from the central storage 118 upon request.

The training module 219 is code and routines that, when executed by the processor 104, provides training to one or more of the decision engine 205 and the classification module 217. For example, the training module 219 retrieves training data (e.g., historical context data) from the local storage 116 and/or the central storage 118 and trains the context resolving module 207 with the training data before applying the context resolving module 207 to resolve any context data. In one embodiment, the training module 219 trains the classification module 217 with the training data (e.g., historical context group data) before applying the classification module 217 to classify any context data and network performance data. In the illustrated embodiment, the training module 219 is communicatively coupled to the bus 220 via signal line 236.

The GUI module 221 is code and routines that, when executed by the processor 104, generates graphical data for providing user interfaces to a user. In the illustrated embodiment, the GUI module 221 is communicatively coupled to the bus 220 via signal line 238. In one embodiment, the GUI module 221 receives network performance data describing a network performance from the measurement module 215 and generates graphical data for providing a user interface to a user. The user interface depicts the network performance. The GUI module 221 sends the graphical data to the interface 120, causing the interface 120 to present the user interface to the user.

In one embodiment, the GUI module 221 receives a subset of operating parameters from the parameter determination module 209 and generates graphical data for providing a user interface to a user. The user interface depicts the subset of operating parameters. In another embodiment, the GUI module 221 receives a context group from the classification module 217 and generates graphical data for providing a user interface to a user. The user interface depicts the context group.

The context module 106 described in FIG. 2 is advantageous in a plurality of aspects. For example, the context module 106 does not replace any specific layer in an existing protocol stack and does not require any modification of the existing protocol stack. The context module 106 operates in parallel to and interfaces with various layers in the protocol stack and distributes one or more sets of operating parameters to various layers in the protocol stack.

Consider a first example related to a physical and link layer SNR-based protocol. The protocol uses a measured channel SNR to determine a transmission rate, a modulation scheme and a coding scheme used for data communication. The collection module 203 collects context data describing a context in the communication environment and the decision engine 205 determines one or more sets of operating parameters (e.g., different combinations of modulation and coding choices) for the context based at least in part on the measured SNR. In one embodiment, the decision engine 205 excludes any modulation scheme and/or coding scheme not applicable for data communication under the context. For example, if the context is a downtown context, the decision engine 205 eliminates the use of a high-order modulation scheme because of multipath effects. The distribution module 213 distributes the one or more sets of operating parameters to the network stack communication module 108. The one or more sets of operating parameters represents a reduced searchable space for adaption in the network stack communication module 108, since the network stack communication module 108 only needs to select operating parameters from the one or more sets provided by the context module 106 instead of searching for operating parameters from scratch.

In a second example, the context module 106 provides a suggested range for an operating parameter such as an estimate range of a contention window used in an adaptive MAC layer in a protocol stack. The decision engine 205 estimates the number of competing users for a contention window based on the context data and determines an estimate range for the contention window based on the estimate number of competing users. The distribution module 213 distributes the estimate range for the contention window to the MAC layer which selects a value for the contention window from the estimate range to achieve a better network performance.

In a third example, the context module 106 provides data communication strategies to a transport layer of a protocol stack based on historical travel data. Consider a user driving a vehicle on the way to work. Based on historical travel data describing a routine route to work and a current travel trajectory, the context module 206 determines that the vehicle is likely to approach a road-side high-speed wireless access unit. If there is any data to transmit, the context module 106 instructs a transport layer (e.g., a UDP/TCP layer) to delay the data transmission until the vehicle is within a communication range of the road-side high-speed wireless access unit so that the vehicle may transmit data to other entities (e.g., a central storage 118, a server, etc.) via the road-side high-speed wireless access unit.

Storage Device

Figure 3:
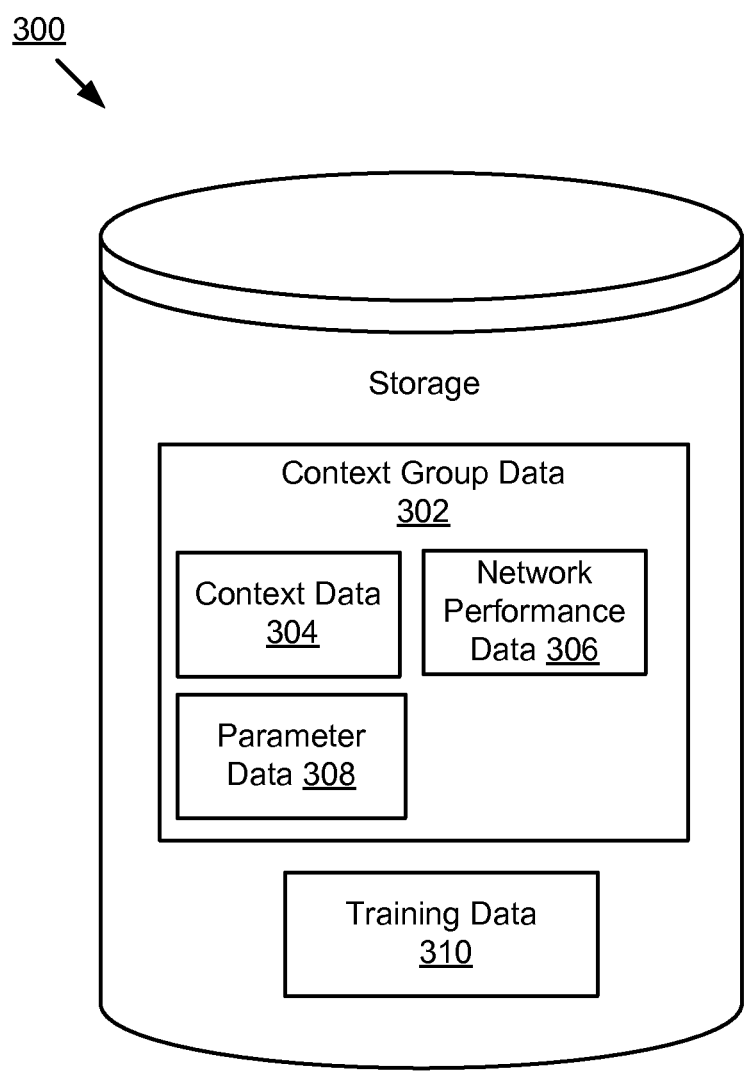
FIG. 3 is a block diagram illustrating a storage device according to one embodiment.

FIG. 3 is a block diagram illustrating a storage device 300 according to one embodiment. In one embodiment, the storage device 300 is a local storage 116. In another embodiment, the storage device 300 is a central storage 118. The storage device 300 includes context group data 302 and training data 310. The storage device 300 may include any other data for providing the functionality described herein.

The context group data 302 is data describing one or more context groups. In one embodiment, the context group data 302 includes historical context group data describing one or more historical context groups. The context group data 302 includes context data 304, network performance data 306 and parameter data 308.

The context data 304 is data describing one or more contexts in one or more communication environments. In one embodiment, the context data 304 includes one or more of sensor data generated by one or more sensors 110 and image data generated by the camera 112. In one embodiment, the context data 304 includes historical context data collected in the past. In one embodiment, the context data 304 includes one or more contextual factors.

The network performance data 306 is data describing network performance in one or more different contexts. For example, the network performance data 306 includes data describing SNR, error rate, delay and throughput in different contexts associated with different operating parameters.

The parameter data 308 is data describing one or more sets of operating parameters. In one embodiment, a set of operating parameters includes one or more operating parameters for one or more layers in a protocol stack. For example, a set of operating parameters includes at least one operating parameter for each of the one or more layers in a protocol stack. As another example, a set of operating parameters includes one or more operating parameters for a single layer in the protocol stack.

The training data 310 is data for training the context module 106. For example, the training data 310 includes data for training one or more of the context resolving module 207 and the classification module 217. In one embodiment, the training data 310 includes historical context data for training the context resolving module 207. In another embodiment, the training data 310 includes historical context group data for training the classification module 217.

Methods

Figure 4:
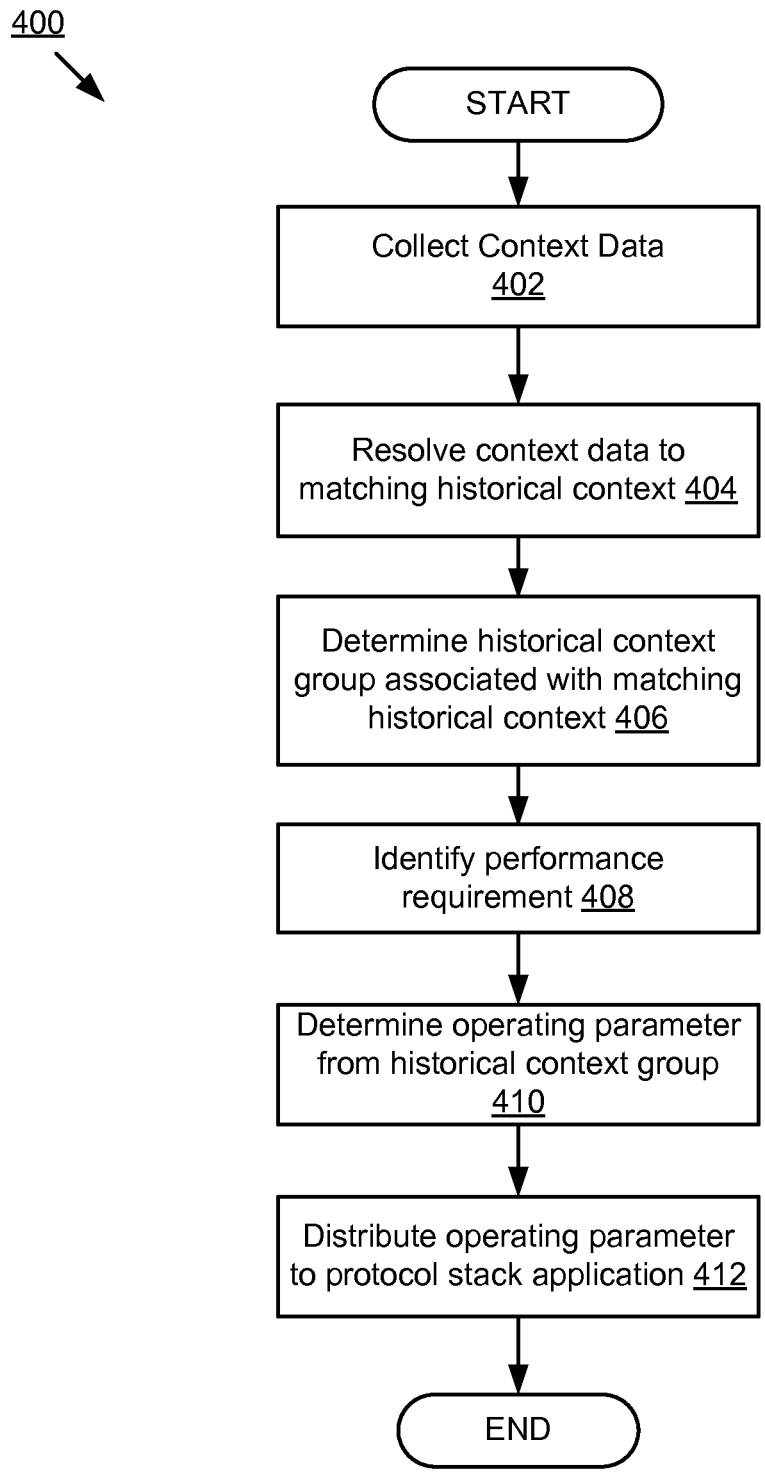
FIG. 4 is a flowchart illustrating a method for providing multi-dimensional context-aware adaptation in vehicular networks according to one embodiment.
Figure 5A:
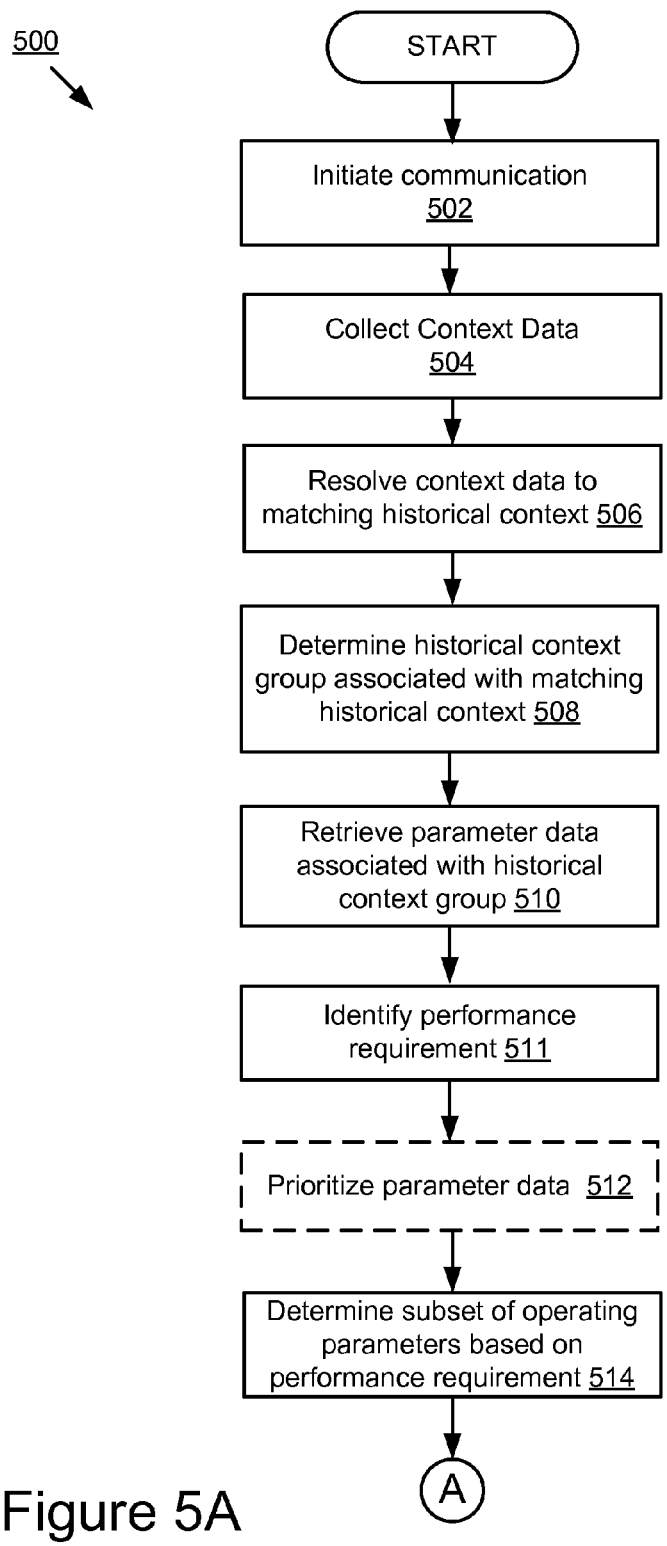
FIGS. 5A and 5B are flowcharts illustrating a method for providing multi-dimensional context-aware adaptation in vehicular networks according to another embodiment.
Figure 5B:
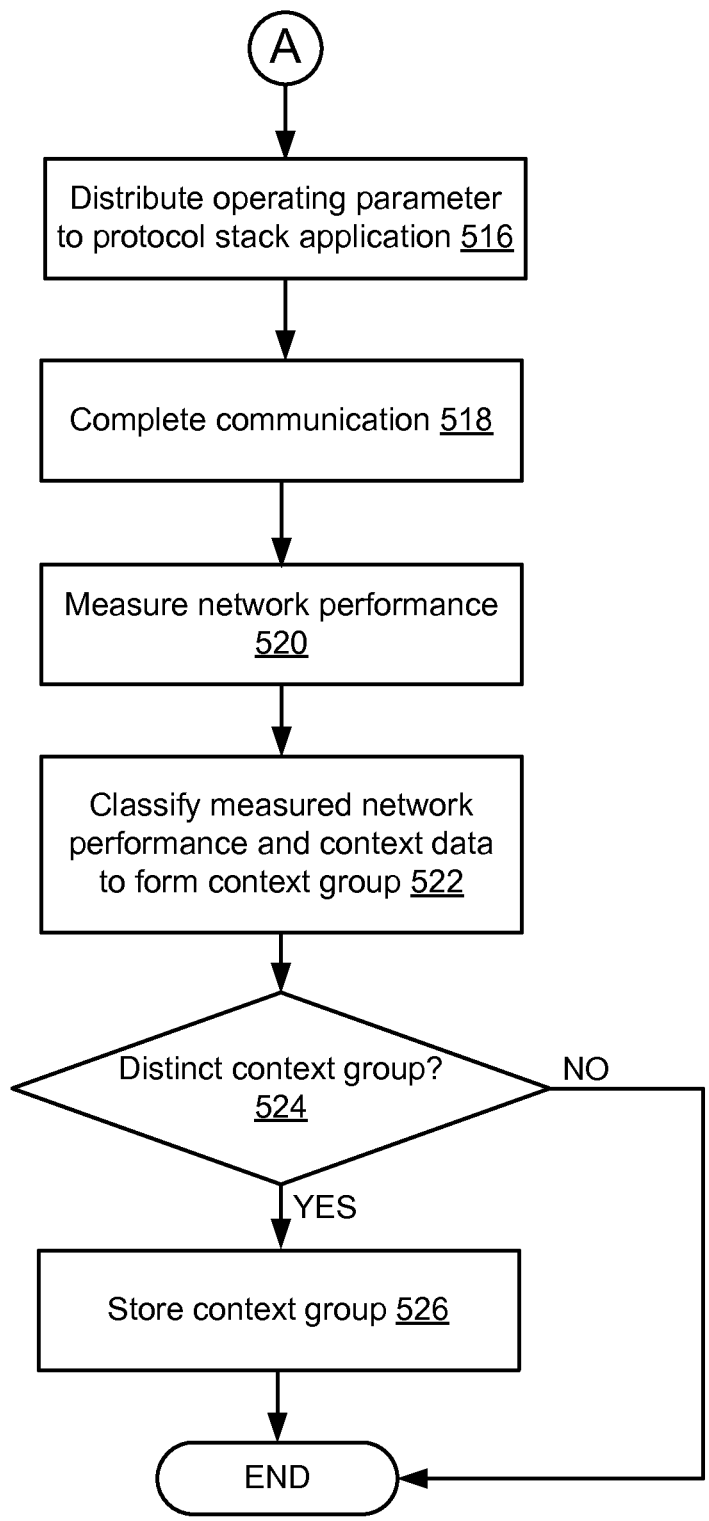
Figure 6:
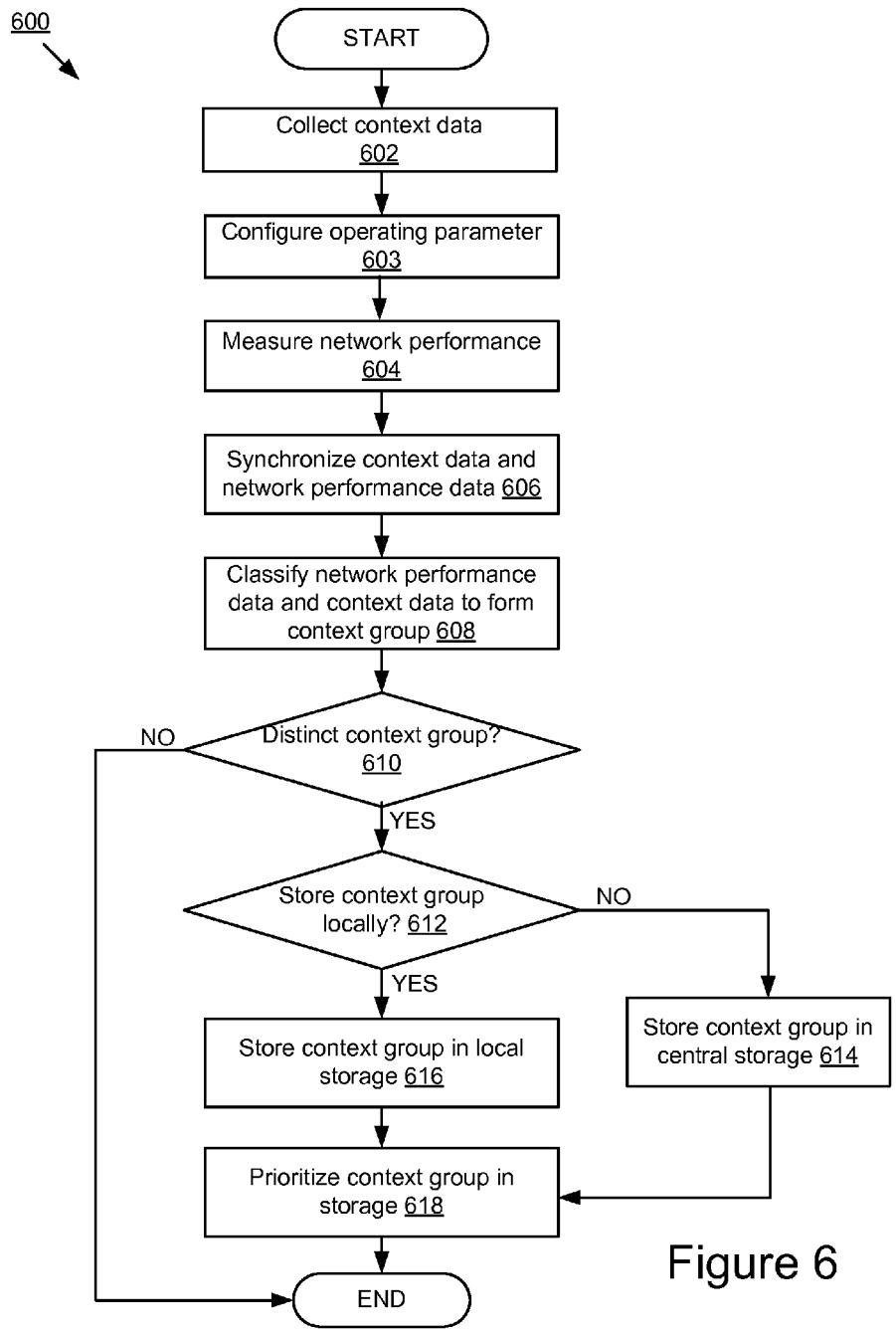
FIG. 6 is a flowchart illustrating a method for populating a storage device with context group data according to one embodiment.

Referring now to FIGS. 4-6, various embodiments of the method of the specification will be described. FIG. 4 is a flowchart illustrating a method 400 for providing multi-dimensional context-aware adaptation in vehicular networks according to one embodiment. The collection module 203 collects 402 context data describing a context in a communication environment. In one embodiment, the context data includes sensor data and/or image data. For example, the collection module 203 collects sensor data from one or more sensors 110. Optionally, the collection module 203 collects image data from the camera 112. The context resolving module 207 resolves 404 the context data to a matching historical context. The context resolving module 207 determines 406 one or more historical context groups associated with the matching historical context. In one embodiment, the context resolving module 207 sends one or more group IDs identifying the one or more historical context groups to the parameter determination module 209.

The parameter determination module 209 identifies 408 a performance requirement for transmitting data in the communication environment. In one embodiment, the performance requirement includes one or more of a SNR requirement, an error rate requirement, a delay requirement, a throughput requirement and/or a QoS requirement. The parameter determination module 209 determines 410, based at least in part on the performance requirement, a subset of operating parameters from one or more sets of operating parameters in the one or more historical context groups. The distribution module 213 distributes 412 the subset of operating parameters to the network stack communication module 108 for configuring one or more layers in a protocol stack.

FIGS. 5A and 5B are flowcharts illustrating a method 500 for providing multi-dimensional context-aware adaptation in vehicular networks according to another embodiment. Referring now to FIG. 5A, the method 500 begins by initiating 502 data communication from a vehicle to another entity (e.g., another vehicle, a road-side network access point, a server, etc.). The collection module 203 comprised within the vehicle collects 504 context data describing a context in the communication environment. The context resolving module 207 resolves 506 the context data to a matching historical context and determines 508 one or more historical context groups associated with the matching historical context. The context resolving module 207 sends one or more group IDs identifying the one or more historical context groups to the parameter determination module 209.

The parameter determination module 209 retrieves 510 context group data including parameter data describing one or more sets of operating parameters associated with the one or more historical context groups from one or more of the local storage 116 and/or the central storage 118. The parameter determination module 209 identifies 511 a performance requirement for transmitting data in the communication environment. Optionally, the parameter determination module 209 instructs the prioritization module 211 to prioritize 512 the one or more sets of operating parameters. The parameter determination module 209 determines 514 a subset of operating parameters from the one or more sets of operating parameters based at least in part on the performance requirement. In one embodiment, the parameter determination module 209 determines a subset of operating parameters further based on the prioritization of the one or more sets of operating parameters.

Referring to FIG. 5B, the distribution module 213 distributes 516 the subset of operating parameters to the network stack communication module 108. The network stack communication module 108 selects a set of operating parameters from the subset of operating parameters and configures a protocol stack using the set of operating parameters. The method 500 completes 518 the data communication after configuring the protocol stack with the set of operating parameters. The measurement module 215 measures 520 a network performance for the data communication. For example, the measurement module 215 measures one or more of a SNR, a delay, a throughput and/or an error rate for the data communication. The measurement module 215 sends network performance data to the classification module 217.

The classification module 217 receives the context data from the collection module 203, the network performance data from the measurement module 215 and the set of operating parameters configured in the protocol stack from the network stack communication module 108. The classification module 217 classifies 522 the measured network performance and the context data to form a context group. The context group includes the context data, the network performance data and the set of operating parameters. In one embodiment, the context group also includes one or more contextual factors. The classification module 217 determines 524 whether the context group is a distinct context group. For example, the classification module 217 determines whether there is any new feature included in the context group. If the context group is distinct, the classification module 217 stores 526 the context group in one or more of the local storage 116 and/or the central storage 118, and the method 500 ends. If the context group is not distinct, the method 500 ends.

FIG. 6 is a flowchart illustrating a method 600 for populating one or more storage devices with context group data according to one embodiment. The collection module 203 collects 602 context data describing a context in a communication environment. The network stack communication module 108 configures 603 a protocol stack using a set of operating parameters. The method 600 begins to transmit data in the communication environment with the implementation of the protocol stack. The measurement module 215 measures 604 a network performance for the set of operating parameters.

The classification module 217 receives the context data from the collection module 203, the network performance data from the measurement module 215 and the set of operating parameters from the network stack communication module 108. In one embodiment, the classification module 217 receives a set of context data and a set of network performance data. The classification module 217 synchronizes 606 the context data with the corresponding network performance data.

The classification module 217 classifies 608 the context data and the network performance data to form a context group. The classification module 217 determines 610 whether the context group is a distinct context group. If the context group is distinct, the method 600 moves to step 612. Otherwise, the method 600 ends. Turning to step 612, the classification module 217 determines whether to store the context group in the local storage 116 or the central storage 118. If the classification module 217 determines to store the context group in the local storage 116, the method 600 moves to step 616. Otherwise, the method 600 moves to step 614. At step 614, the classification module 217 stores the context group in the central storage 118 and the method 600 moves to step 618.

Turning to step 616, the classification module 217 stores the context group in the local storage 116. The prioritization module 211 prioritizes 618 the context group stored in one of the local storage 116 and/or the central storage 118.

Graphical Representations

FIG. 7A is a graphical representation of a table 700 illustrating collected sensor data according to one embodiment. In the illustrated embodiment, the table 700 includes a first column 702 listing one or more sensors and a second column 704 listing one or more outputs from the one or more sensors. For example, the table 700 includes a GPS with output of time, latitude, longitude and altitude.

FIG. 7B is a graphical representation of a table 730 illustrating content included in a context group according to one embodiment. In the illustrated embodiment, the table 730 includes a first column 732, a second column 734 and a third column 736. The first column 732 includes one or more contextual factors such as time-of-day, location, etc. The second column 734 includes one or more operating parameters such as frequency band, modulation rate, etc. The third column 736 includes one or more performance metrics such as SNR, delay, throughput, etc.

FIG. 7C is a graphical representation of a table 750 illustrating operating parameters for various layers according to one embodiment. In the illustrated embodiment, the table 750 includes a first column 752 and a second column 754. The first column 752 includes one or more layers in a protocol stack such as a physical layer, a media access layer, etc. The second column 754 includes one or more operating parameters for the corresponding layers listed in the first column 752. For example, the table 750 lists two operating parameters "choice of protocol" and "congestion window" for the transport layer.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method for providing multi-dimensional context-aware adaptation in vehicular networks, the method comprising:
    collecting context data describing a context in a communication environment;
    resolving the context data to a matching historical context;
    determining one or more historical context groups associated with the matching historical context;
    determining a subset of operating parameters from the one or more historical context groups;
    distributing the subset of operating parameters to a network stack communication module;
    measuring a network performance for the subset of operating parameters;
    classifying the network performance, the context data, and the subset of operating parameters to form a context group;
    determining that the context group is a distinct context group; and
    responsive to the determination that the context group is distinct, storing the distinct context group including the context data, data describing the network performance and the subset of operating parameters.

2. The method of claim 1, wherein determining the subset of operating parameters comprises:
    identifying a performance requirement for transmitting data in the communication environment;
    determining one or more sets of operating parameters associated with the one or more historical context groups; and
    determining, based at least in part on the performance requirement, the subset of operating parameters from the one or more sets of operating parameters.

3. The method of claim 2 further comprising:
    prioritizing the one or more sets of operating parameters based at least in part on the performance requirement; and
    determining the subset of operating parameters further based on the prioritization of the one or more sets of operating parameters.

4. The method of claim 2, wherein the performance requirement is one of a signal-to-noise ratio requirement, a bit error rate requirement, a packet error rate requirement, a delay requirement, a throughput requirement and a quality of service requirement.

5. The method of claim 1, wherein the subset of operating parameters include one or more operating parameters for configuring one or more layers in a protocol stack.

6. The method of claim 1, wherein the context data includes one or more of sensor data and image data obtained in the communication environment.

7. A computer program product comprising a non-transitory computer readable medium encoding instructions that, in response to execution by a computing device, cause the computing device to perform operations comprising:
    collecting context data describing a context in a communication environment;
    resolving the context data to a matching historical context;
    determining one or more historical context groups associated with the matching historical context;
    determining a subset of operating parameters from the one or more historical context groups;
    distributing the subset of operating parameters to a network stack communication module;
    measuring a network performance for the subset of operating parameters;
    classifying the network performance, the context data, and the subset of operating parameters to form a context group;
    determining that the context group is a distinct context group; and
    responsive to the determination that the context group is distinct, storing the distinct context group including the context data, data describing the network performance, and the subset of operating parameters.

8. The computer program product of claim 7, wherein determining the subset of operating parameters comprises:
    identifying a performance requirement for transmitting data in the communication environment;
    determining one or more sets of operating parameters associated with the one or more historical context groups; and
    determining, based at least in part on the performance requirement, the subset of operating parameters from the one or more sets of operating parameters.

9. The computer program product of claim 7 further comprising instructions for causing the computer device to perform further operations comprising:
    prioritizing the one or more sets of operating parameters based at least in part on the performance requirement; and
    determining the subset of operating parameters further based on the prioritization of the one or more sets of operating parameters.

10. The computer program product of claim 8, wherein the performance requirement is one of a signal-to-noise ratio requirement, a bit error rate requirement, a packet error rate requirement, a delay requirement, a throughput requirement and a quality of service requirement.

11. The computer program product of claim 7, wherein the subset of operating parameters include one or more operating parameters for configuring one or more layers in a protocol stack.

12. The computer program product of claim 7, wherein the context data includes one or more of sensor data and image data obtained in the communication environment.

13. A system for providing multi-dimensional context-aware adaptation in vehicular networks, the system comprising:
 a collection module collecting context data describing a context in a communication environment;
 a context resolving module communicatively coupled to the collection module, the context resolving module resolving the context data to a matching historical context and determining one or more historical context groups associated with the matching historical context;
 a parameter determination module communicatively coupled to the context resolving module, the parameter determination module determining a subset of operating parameters from the one or more historical context groups;
 a distribution module communicatively coupled to the parameter determination module, the distribution module distributing the subset of operating to a network stack communication module;
 a measurement module communicatively coupled to a classification module, the measurement module measuring a network performance for the subset of operating parameters; and
 a classification module classifying the network performance, the context data, and the subset of operating parameters to form a context group; determining that the context group is a distinct context group; and responsive to the determination that the context group is distinct, storing the distinct context group including the context data, data describing the network performance, and the subset of operating parameters.

14. The system of claim 13, wherein determining the subset of operating parameters comprises:
 identifying a performance requirement for transmitting data in the communication environment;
 determining one or more sets of operating parameters associated with the one or more historical context groups; and
 determining, based at least in part on the performance requirement, the subset of operating parameters from the one or more sets of operating parameters.

15. The system of claim 14 further comprising:
 a prioritization module communicatively coupled to the parameter determination module, the prioritization module prioritizing the one or more sets of operating parameters based at least in part on the performance requirement, wherein the parameter determination module determining the subset of operating parameters further based on the prioritization of the one or more sets of operating parameters.

16. The system of claim 14, wherein the performance requirement is one of a signal-to-noise ratio requirement, a bit error rate requirement, a packet error rate requirement, a delay requirement, a throughput requirement and a quality of service requirement.

17. The system of claim 13, wherein the subset of operating parameters include one or more operating parameters for configuring one or more layers in a protocol stack.

18. The system of claim 13, wherein the context data includes one or more of sensor data and image data obtained in the communication environment.

\* \* \* \* \*